United States Patent [19]
Sato et al.

[11] Patent Number: 4,577,381
[45] Date of Patent: Mar. 25, 1986

[54] BOILING HEAT TRANSFER PIPES

[75] Inventors: Yoshiyuki Sato; Akio Isozaki; Tomio Higo; Tetsuo Uchida, all of Kanagawa, Japan

[73] Assignee: Kabushiki Kaisha Kobe Seiko Sho, Kobe, Japan

[21] Appl. No.: 577,504

[22] Filed: Feb. 6, 1984

[30] Foreign Application Priority Data

Apr. 1, 1983 [JP] Japan .................................. 58-58333
Apr. 26, 1983 [JP] Japan .................................. 58-74351

[51] Int. Cl.$^4$ ............................................. B23P 15/26
[52] U.S. Cl. .................................. 29/157.4; 165/133; 29/157.3 AH
[58] Field of Search .................... 165/179, 133; 29/157.3 R, 157.4, 149.5 R, 726, 727, 157.3 AH, 157.3 A

[56] References Cited

U.S. PATENT DOCUMENTS 4,159,739 7/1979 Brothers et al. ................ 165/133
4,216,826 8/1980 Fujikake ........................... 165/133
4,359,086 11/1982 Sanborn et al. ................... 165/133

FOREIGN PATENT DOCUMENTS 52-9160 1/1977 Japan .................................. 165/133

Primary Examiner—Mark Rosenbaum
Assistant Examiner—John T. Burtch
Attorney, Agent, or Firm—Oblon, Fisher, Spivak, McClelland & Maier

[57] ABSTRACT

A method for producing a boiling heat transfer pipe having in the circumferential wall thereof one or a number of helical or annular cavities under a ceiling wall containing a row of openings regularly spaced at predetermined intervals along the length of the cavities, such method partly including in an arbitrary order the steps of: (a) pressing a set of groove-rolling discs of gradually increased diameters against the outer surface of a blank pipe to form a fin around the circumference of the pipe; (b) pressing a notching gear against the outer side of the fin to cut notches in upper fin portions at predetermined intervals along the length of the fin; (c) pressing a set of splitting roller discs with splitting edges of gradually increased angles substantially along a center line on the outer side of the fin to split and spread apart the upper fin portions in the axial direction of the pipe; and (d) pressing a press roller centrally against the split upper fin portions to form flat side wings on lateral sides of the fin in flush abutting engagement with side wings of adjacent fin portions, covering grooves on opposite sides of the fin to provide cavities having in the ceiling wall thereof a row of openings regularly at predetermined intervals corresponding to the pitch of the notches.

2 Claims, 27 Drawing Figures

BOILING HEAT TRANSFER PIPES

BACKGROUND OF THE INVENTION

1. Field of the Invention

This invention relates to a method for producing an ebullient heat transfer pipe with an extremely high heat transfer rate in a facilitated and economical manner, the pipe being particularly suitable for use in boiling type heat exchangers.

2. Description of the Prior Art

In order to increase the heat transfer rate of a heat transfer pipe or a so-called boiling heat pipe which is resorted to for the purpose of effectively transferring heat to a liquid such as liquefied nitrogen, liquefied oxygen, alcohol, water or the like which is in contact with a pipe surface, it is necessary to improve the boiling heat transfer characteristics in a range of low temperature differences. Therefore, as shown in FIG. 1 (i.e. a sectional view in the axial direction of a heat transfer pipe), it has been the general practice in the manufacture of boiling heat pipes to work the pipes such that in the final stage each pipe is provided with a multitude of openings (or gaps) a on the pipe surface and cavities (or tunnels) b which communicate the respective openings in the circumferential direction. In FIG. 1, reference character c denotes a released bubble, and reference character d a bubble which has been left in a cavity b. The pipe is desired to be able to hold part of the generated bubbles as much as possible in the cavities b from the standpoint of accelerating ebullition of a liquid and enhancing the heat transfer rate.

Following are three typical methods which have thus far been used in the art for the production of pipes of this sort.

(1) A method of forming a porous layer on the surface of a pipe by sintering fine metal particles thereon.

(2) A method of ploughing out a helical fin of sawtoothed shape on the surface of a pipe by the use of a cutting tool and then bending the wavy fin in an axial direction of the pipe by a wire brush to form a helical tunnel-like cavity which is intermittently covered with the bent fin portions.

(3) A method of breaking upper side portions of a fin by plastic deformation in a conventional fin-forming process and laterally bulging out shoulder portions of the respective upper fin portions by compressive deformation to thereby form a tunnel-like cavity with openings at certain intervals, followed by partial compressive deformation of the fins for deforming the openings of the cavity into wide and narrow openings.

A pipe which is obtained by method (1) contains three-dimensionally distributed fine pores forming a large number of bubble generating nuclei and communicating with each other in various directions, such that it has an advantage in that a liquid can be continuously supplied to pores of active ebullition from pores of inactive ebullition through intercommunicating passages to accelerate the boiling heat transfer with a suitable bubble holding and developing effect. However, the method (1) which involves a sintering process inevitably suffers from low productivity and high production cost. In addition, it is difficult to form pores of uniform diameters owing to a difficulty of securing metal particles of uniform sizes and to ensure the above-mentioned bubble holding and developing effect occurring over the entire length of a pipe.

The pipes which are obtained by methods (2) and (3) have the openings communicated one-dimensionally by a helical cavity which extends in the circumferential direction of a pipe, such that they have a common problem in that a shortage of liquid supply occurs upon activation of ebullition. Accordingly, such are limited in the effect of accelerating the boiling heat transfer, and inferior in the above-mentioned bubble holding effect, coupled with a low productivity in the case of method (2) in which a fin is ploughed out by means of a cutting tool (e.g., a cutter) and which involves the possibility of fracturing pipes due to enlargement of fine cracks occurring in the fin-ploughing stage. Further, it is necessary in the case of method (3) to effect the compressive deformation within a range free of buckling of fins, but it is extremely difficult to carry out the compressive deformation in good condition and the manufacturing process requires complicated and costly equipment.

SUMMARY OF THE INVENTION

With the foregoing situations in view, the present invention has as its object the provision of a high quality boiling heat transfer pipe with an extremely high boiling heat transfer rate and a method for continuously producing such a boiling heat transfer pipe in a stable and economical manner.

According to one aspect of the present invention, there is provided a method for manufacturing a boiling heat transfer pipe having in the circumferential wall thereof one or a plurality of helical or annular cavities extending in the circumferential direction of the pipe and each communicated with the exterior by a row of openings formed centrally in the ceiling walls of the cavities regularly spaced at predetermined intervals in the circumferential direction of the pipe, the method basically comprising: pressing a set of groove-rolling discs against the outer surface of a blank pipe to form a helical fin thereon; pressing a notching gear against the upper side of the fin to cut notches in the upper fin portions at predetermined intervals along the length of the fin; pressing a set of splitting roller discs substantially along a center line on the upper side of the fin to split and spread same in the axial direction of the pipe; and pressing a press roller centrally against the split upper fin portions to form flat side wings on lateral sides of the fin in flush abutting engagement with side wings of adjacent fin portions, covering grooves on opposite sides of the fin to provide a cavity having in the ceiling wall thereof a row of openings regularly spaced at predetermined intervals corresponding to the pitch of said notches. According to the present invention, the above-mentioned fin-forming, notching, splitting and flattening operations are performed successively by means of a plurality of rolling tools which are positioned around the circumference of a pipe to be processed and each or at least one of which has a set of fin-forming rolling discs, a notching gear, a set of splitting rolling discs and a presser roller. The rolling tools may be so arranged as to perform the notching operation after the flattening step, if desired. The adjacent cavity portions of the pipe can be communicated with each other by cutting a slit at the bottom of the respective notches in the notching stage subsequent to the fin-forming operation. Alternatively, the openings may be formed by notching or boring the ceiling walls of the respective cavity portions or by cutting notches across partition walls between the respective cavity portions.

The heat transfer pipe which is produced by the method of the present invention contains annular or helical tunnel-like cavities in its circumferential wall, with a row of openings formed either in the ceiling walls of the cavities or across the partition walls between adjacent cavity portions regularly spaced at predetermined intervals in the circumferential direction of the pipe. In a preferred form of the invention, the openings are each provided with a fringed wall around its inner end on the side of the cavity to further increase the bubble holding and developing effect of the pipe.

The above and other objects, features and advantages of the present invention will become apparent from the following description and appended claims, taken in conjunction with the accompanying drawings which show by way of example some illustrative embodiments of the invention.

DETAILED DESCRIPTION OF THE EMBODIMENTS

Figure 1:
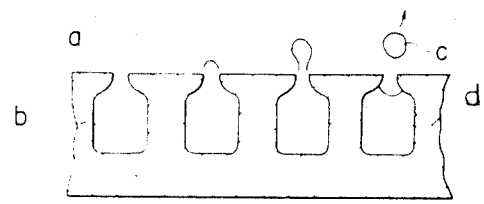
FIG. 1 is a longitudinal sectional view of a conventional heat transfer pipe.

Hereafter, the invention is described more particularly by way of preferred embodiments shown in the accompanying drawings. It is to be understood that the particular embodiments in the drawings are given for the purpose of illustration only and should not be construed as being limitative of the present invention. It is possible for those skilled in the art to add alterations or modifications within the scope of the invention defined in the appended claims, particularly with regard to the shapes and arrangements of groove-rolling discs, a notching gear, splitting roller discs, and a press roller which will appear in the following description.

Figure 2:
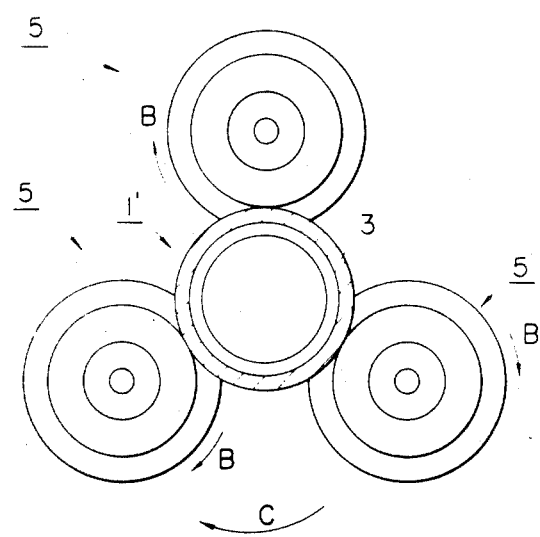
FIG. 2 is a rear end view of a pipe in a roll-forming operation according to the present invention.

Referring to FIGS. 2 to 5 and 7, there is shown at 3 a blank pipe of a metal such as Cu or Al (or an alloy thereof), at 4 a mandrel for restricting the inner side of the pipe 3, and at 5 a rolling tool (generally three rolling tools being set around a blank pipe as shown particularly in FIG. 2). The rolling tools 5 each consists of a set of fluting or groove-rolling discs 5a, a notching gear 5b, a set of splitting roller discs 5c, and a press roller 5d, all loosely mounted on a shaft 6 (for rotation about the shaft 6 independently of each other at different circumferential speeds), and are as a whole revolvable in a predetermined position in the direction of arrow C (FIG. 2). While holding the blank pipe 3 in a restricted state on the mandrel 4, the respective rolling tools 5 which are pressed against the outer surface of the blank pipe are rotated in the direction of arrow B (FIG. 2) and at the same time revolved as a whole in the direction of arrow C, to thereby form a helical fin 2, cut notches at uniform intervals along the length of the fin 2, split and spread the fin 2 in the axial direction and finally form openings 7 and cavities 8 on the pipe 3. Thus, in this case the above-mentioned four different forming operations are successively performed by each rolling tool 5 through the respective stages as will be described in greater detail hereinafter.

Figure 3:
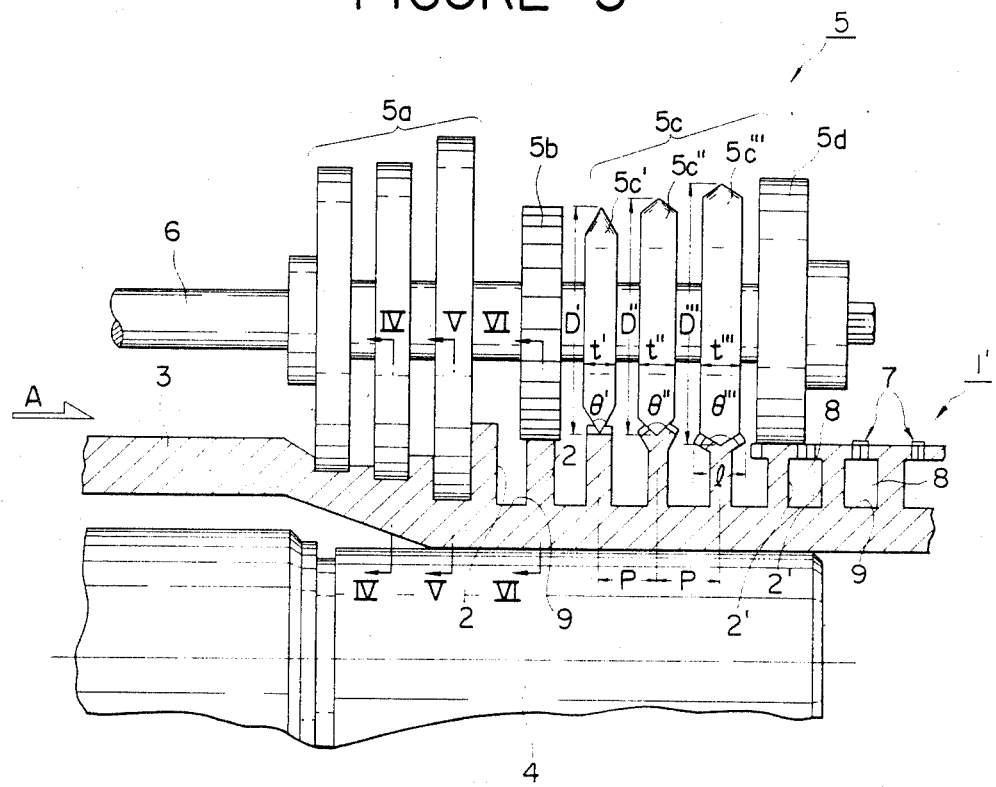
FIG. 3 is a logitudinal sectional view of a pipe undergoing successively the respective stages of the roll-forming operation by a rolling tool according to the invention.
Figure 4:
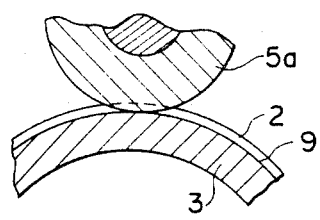
FIGS. 4, 5 and 7 are sectional views taken on lines IV—IV, V—V and VII—VII of FIG. 3, respectively, showing the conditions of a pipe in fin-forming and notching stages.
Figure 5:
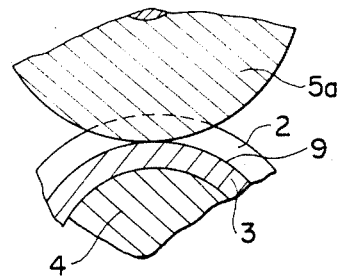

(1) The first forming stage by the fluting or groove-rolling discs 5a: As shown in FIG. 3, the groove-rolling discs 5a have gradually increased diameters in the rightward direction of that Figure, so as to progressively sink outer surface portions of the blank pipe 3 to form a helical groove 9 or a fin 2 (FIGS. 4 and 5).

Figure 6:
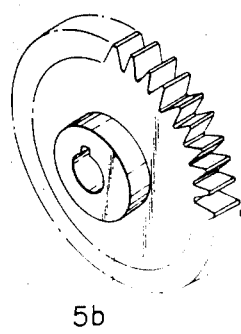
FIGS. 6 and 9 are schematic views showing examples of the notching gear.
Figure 7:
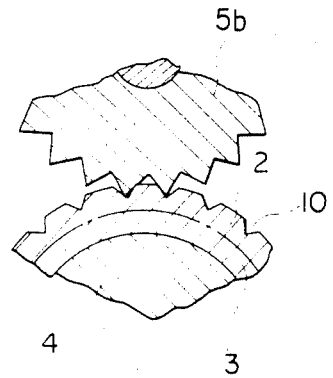

(2) The second forming stage by the notching gear 5b: The teeth of the gear member 5b, as shown in FIG. 6, are pressed against the fin 2 to form axial notches 10 at regular intervals along the length of the fin 2 in preparation for the formation of openings 7 in a later stage. The notches are not necessarily limited to the triangular shape shown in FIG. 6 and may be formed in a rectangular, semi-circular or other arbitrary shape by suitably changing the toothed end shape of the notching gear member 5b.

(3) The third forming stage by the splitting roller discs 5c: The splitting roller discs 5c are each provided with a cutting edge around the circumference thereof for splitting the fin along a center line of its outer end face, progressively spreading the split upper fin portions by pressing thereagainst rolling discs of greater diameters. In order to split apart the fin smoothly, the rolling discs should gradually edge into the fin while spreading the split fin portions in the axial direction. For this purpose, it is preferred to employ rolling discs $5'c$, $5''c$ and $5'''c$ which are different from each other in outer diameter D, edge angle $\theta$ and thickness t, more particularly, in which $D'<D''<D'''$, $\theta'<\theta''<\theta'''$ and $t'<t''<t'''$ as shown in FIG. 3. From a standpoint of stability in shaping the, thickness t of each splitting disc is preferred to be greater than the distance l over which the fin is to be split apart. In the particular embodiment shown, the rolling tool employs splitting roller discs in which $T'<l1$, $t''<l2$ and $t'''<l3$. However, the relative difficulty of the splitting operation varies depending upon the pipe material (e.g., copper, copper alloy, aluminum, stainless steel, titanium etc.), the fin shape (e.g., its thickness and height) and the pitch (P), so that it is recommended to determine the number of splitting roller discs with consideration of actual operating conditions.

(4) The fourth forming stage by the press roller 5d: This is a final stage of the roll-forming operation. The presser roller 5d is rolled on the upper surfaces of the fin which has been split apart in the previous stage (3), thereby flattening the split fin portions in the axial direction of the pipe, forming flat side wings in flush and abutting engagement with similar flat side wings of adjacent fin portions. Consequently, as shown in FIG. 3, the groove 9 between the fin portions 2 is closed under a ceiling constituted by the abutted side wings with a row of openings 7 regularly spaced at predetermined intervals at a center position.

In order to carry out the flattening and abutting operation more smoothly in this forming stage, it is desirable to employ, instead of a single press roller 5d, a set of press rollers which are gradually increased in outer diameter and thickness in a manner similar to the splitting discs in state (3), thereby progressively flattening the split fin portions into the flush abutting state. Of course, it is possible to flatten the split fin portions sufficiently by a single press roller 5d depending upon the material or shape of the fin to be actually worked.

Figure 8:
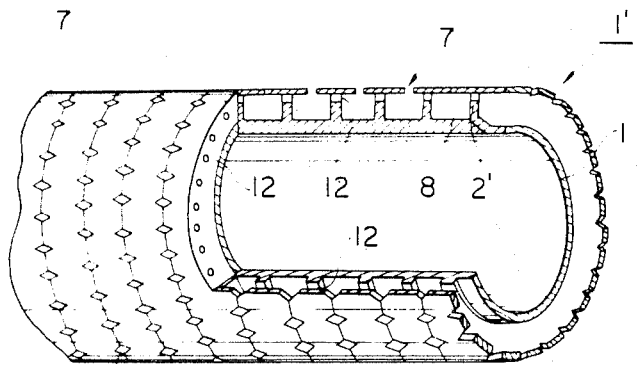
FIG. 8 is a partly cutaway perspective view of a heat transfer pipe produced by the method of the present invention.
Figure 13:
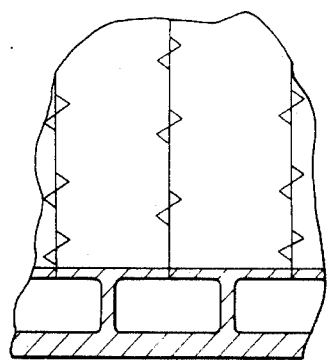
FIG. 13 is a fragmentary view of a heat transfer pipe with openings in staggered positions along the center line of each cavity portion.

FIG. 8 shows the appearance and construction of a heat transfer pipe 1 which is obtained by the successive pipe working operations of the above-described stages (1) to (4). Although notches in adjacent fin portions are matched in the particular example shown in FIG. 8, they may be formed in staggered positions as shown in FIG. 13, if desired. The heat transfer pipe 1 produced by the method of the present invention has a feature that a helical tunnel-like cavity 8 is continuously formed along the outer surface of the pipe, and openings 7 are provided substantially centrally in the top wall of the cavity 8 at regular intervals in the circumferential direction.

A heat transfer pipe with the above-described construction has excellent boiling heat transfer performance owing to the following effects accruing from its particular construction. Namely, if the pipe 1' is immersed in a liquid to be boiled and a hot fluid is conducted through the pipe, the liquid is heated and the boiling liquid in the cavity especially generates bubbles. The generated bubbles are formed in the cavity 8 and are then released from the pipe 1' through the openings 7. More specifically, since the openings 7 in the heat transfer pipe 1' have a diameter smaller than the width of the cavity 8 and converge in a radially outward direction, the boiling bubbles partly remain in the cavity 8 and form thin liquid films therein without changing the resistance to heat transmission in any material degree. Consequently, the liquid in the cavity 8 can be boiled efficiently even at a low degree of superheating. On the other hand, as bubbles are released, the liquid to be boiled is efficiently supplied to the cavity portion where the liquid is in active ebullition, through openings which are free of air bubbles. Efficient and continuous ebullition of the liquid is stably maintained in this manner, so that the boiling heat transfer rate of the heat transfer pipe 1' can be improved to a remarkable degree.

Figure 9:
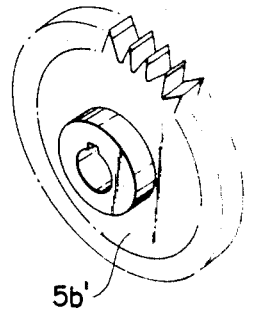
Figure 10:
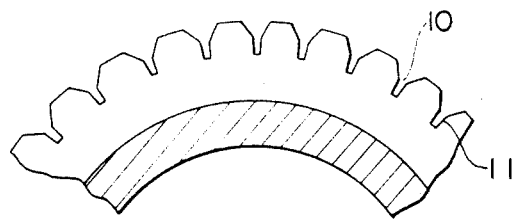
FIGS. 10 to 12 are fragmentary views of a pipe and a splitting roller disc in a modified embodiment of the invention.
Figure 11:
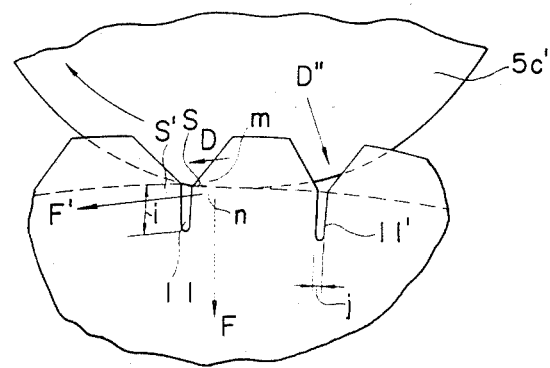
Figure 12:
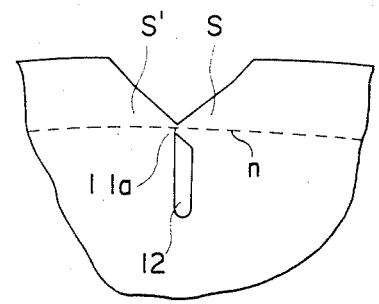

In a case where a gear member is shown at $5b'$ of FIG. 9 is employed in the rolling operation in the second forming stage (2), the fin is formed with notches 10 each having at its bottom a slit 11 of a predetermined depth as shown in FIG. 10. Upon splitting a fin with such slits 11 by the splitting roller discs 5c in the third forming stage (3), the center root portion n of the fin which is being split by a splitting roller disc 5c as shown in FIG. 11 is subjected to a compressive force F acting in a direction perpendicular to the axis of the pipe and a stretching force F' acting in the circumferential direction. As a result, a root end portion S at the center of each notch is deformed in the direction of arrow D, and, in a case where the slit 11 has a suitable width, it is abutted against an adjacently opposing root end portion S' as shown particularly in FIG. 12, forming a lid over the slit 11. This can be attained by adjusting the outer diameter $D''$ of the discs $5c'$ and/or the depth i of the slits 11 such that the edged ends m of the discs $5c'$ will fall short of the lower ends R of the slits 11. By a predetermined press-forming operation in the next stage (4), intercommunicating holes 12 are formed in upper portions of a partition wall between the respective adjacent cavity portions 8 as seen in FIG. 8. The intercommunicating holes 12 are formed at uniform intervals in the upper portions of the helical partition wall 2' extending in the circumferential direction of the pipe.

In contrast to the above-described heat transfer pipe 1', the pipe 1'' of the second embodiment permits migration of the boiling liquid between axially adjacent cavity portions 8. As a consequence, as compared with the heat transfer pipe 1' in which migration of the boiling liquid takes place only in the circumferential direction, it can more smoothly perform the boiling cycle which consists of the phases of generation of bubbles, growth of bubbles, release of bubbles, induction of fresh liquid and generation of bubbles, further enhancing the boiling heat transfer rate.

Of course, the method of the present invention does not include the conventional sintering process of low productivity in the production of the heat transfer pipes 1' and 1'', and in addition the fin is formed by the press-rolling operation of the roller discs instead of ploughing it out by the use of a cutting tool, so that the productivity of the heat transfer pipes can be improved to a significant degree, almost precluding the possibilities of fine cracks developing in the cavity portions (indicated at 8 in the drawings). As described hereinabove, the formation of the openings and cavity portions is achieved not by bulging out shoulder portions of upper fin portions in lateral directions through compressive deformation as in the conventional method but rather by cutting upper end portions in the circumferential direction of the pipe and spreading apart the upper end portions in the direction of pipe axis. Accordingly, there is no possibility of causing buckling to the fin nor is there any need for providing a mechanism or a step for preventing fin buckling, permitting simplifying of the arrangement of the production equipment.

The optimum condition of the cavity structure generally varies depending upon physical properties (e.g., surface tension, viscosity, density etc.) or thermal flux of the liquid to be boiled, and it is possible to produce heat transfer pipes which can easily comply with diversified specifications of various boiling type heat exchangers by selecting suiable dimensions for the cavity, including the width and height of the cavity, the size and pitch of the openings and the size of the intercommunicating holes between adjacent cavity portions.

Figure 14:
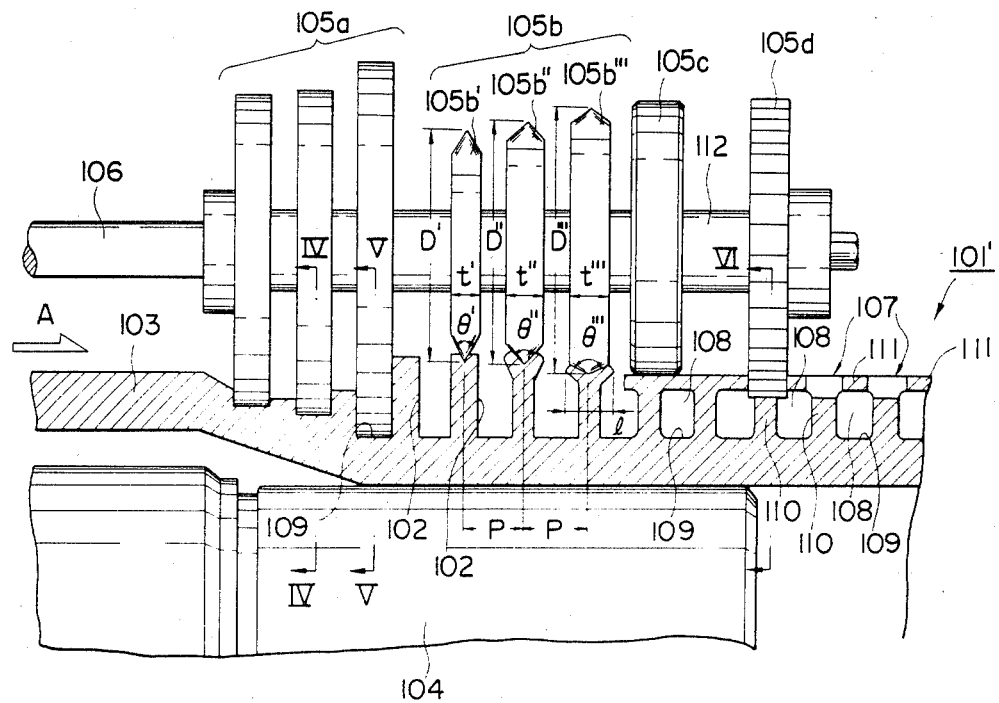
FIG. 14 is a view similar to FIG. 3 but showing a rolling tool in another embodiment of the invention.

Referring to FIG. 14, there is shown a modification of the rolling tool 5 shown in FIG. 3, in which the rolling tool 105 is arranged in the same way as in FIG. 3 except that a notching gear 105c is mounted in a position posterior to a press roller 105c to cut openings in the flattened top portions of partition walls spaced at suitable regular intervals along the length thereof.

Figure 15:
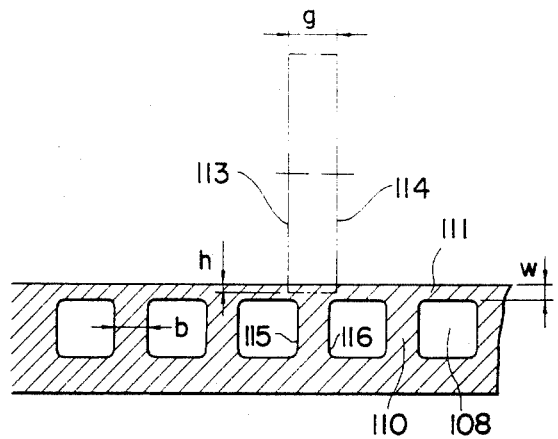
FIG. 15 is a schematic view showing a notching operation of the final forming stage in the embodiment of FIG. 14.
Figure 16:
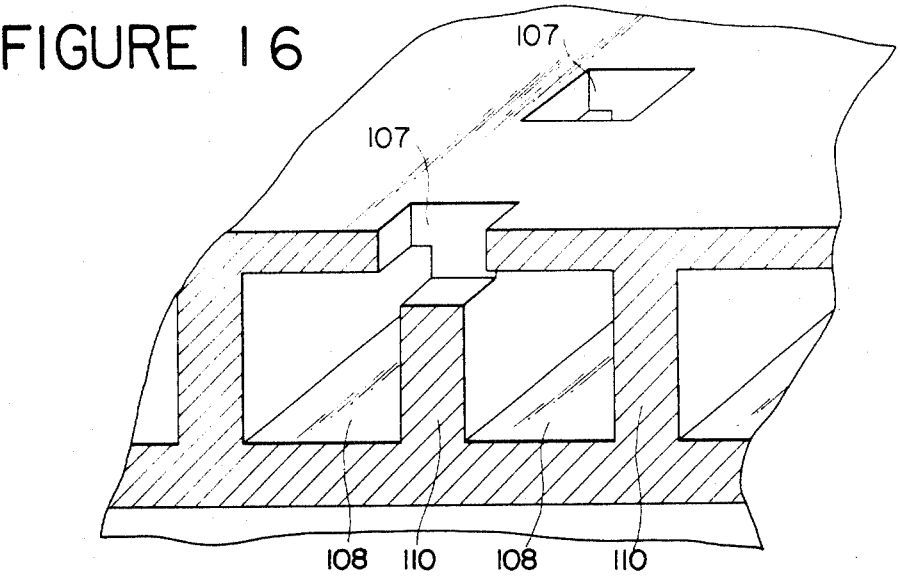
FIGS. 16 and 17 are schematic enlarged views of notches extending to the opposite sides of a partition wall and notches extending to one side of a partition wall, respectively.

More specifically, after forming a helical fin by the groove-rolling discs 5a and splitting and flattening the upper portions of the fin by the splitting roller discs 5c, a notching gear 105b, being the same as the one shown in FIG. 6, is pressed against the partition wall 102′ between the respective adjacent cavity portions 108 to cut notches in the partition wall 110. At this time, openings 7 which communicate the cavity portions with the exterior are formed according to the depth h of the notches, thickness w of the ceiling wall of the cavity, thickness g of the gear member 105b, positional relationship between the gear member 105d and partition wall 110, and thickness f of the partition wall (FIGS. 14 and 15), as follows:

(a) When $g > f$: The notching gear 105d is located such that its opposite end faces 113 and 114 are positioned on the outer sides of the opposite lateral sides 115 and 116 of a partition wall 110, respectively, and the notching gear 105d is sunken into the pipe wall until a depth of $h > w$ is reached. By so doing, cavity portions on opposite sides of a partition wall 110 are communicated with the exterior through a common opening 107 (FIG. 16).

Figure 17:
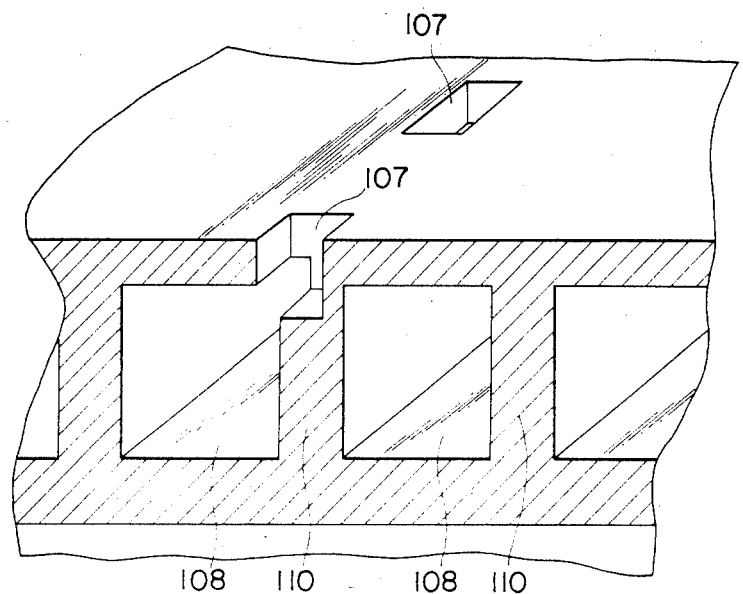

(b) When $g < f$: The gear member 105d is located such that its one end face (113 or 114) is positioned on the outer side of one lateral side (115 or 116) of a partition wall 110, and the gear member is sunken until a depth of $h > w$ is reached. By so doing, an opening 107 is formed on one side of the partition wall 110, communicating one cavity portion 108 with the exterior (FIG. 17).

It is an important point in both of the above-mentioned cases (a) and (b) that the major portion of the gear member 105d rides on the partition wall 110. This is undesirable since, if the gear member 105d were completely offset relative to the partition wall 10 (or more than a certain degree), it would tend to depress the ceiling wall (which is formed by splitting and flattening the upper end portion of a fin in the second and third forming stages in this case) of a cavity portion 8 and to set apart the abutted sides of the flattened fin portions, forming a continuous crevice over the cavity 8 along the entire length thereof.

The position of the gear member 105d can be adjusted by varying the thickness of a spacer 112. On the other hand, the press-in depth h can be adjusted simply by varying the outer diameter of the gear member 105d. The opening 107 can be formed in a rectangular, arcuate or any other arbitrary shape by suitably altering the toothed end shape of the gear member 105d.

Similarly to the foregoing embodiments, a heat transfer pipe 101 which is produced by the rolling tool 105 of FIG. 14 is provided with a helical tunnellike cavity 108 around the outer pipe surface, and has a row of openings 107 formed in the partition wall 110 beween adjacent cavity portions 108 at uniform intervals in the circumferential direction to communicate one or both of the cave portions on opposite sides of the partition wall 110 with the exterior. The heat transfer pipe 101 has the same excellent boiling heat transfer function as the pipes 1′ and 1″ of the foregoing embodiments.

Figure 18:
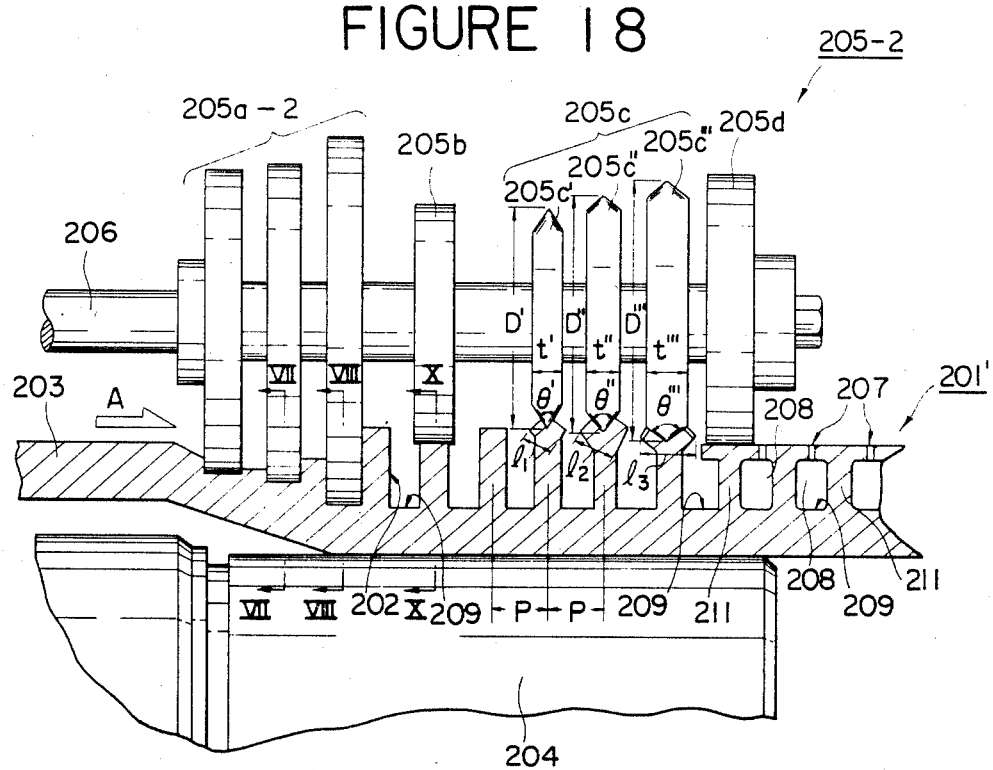
FIG. 18 is a longitudinal section of a pipe being worked by one of three different rolling tools in another embodiment of the invention, the rolling tool having the same construction as in FIG. 3.
Figure 19:
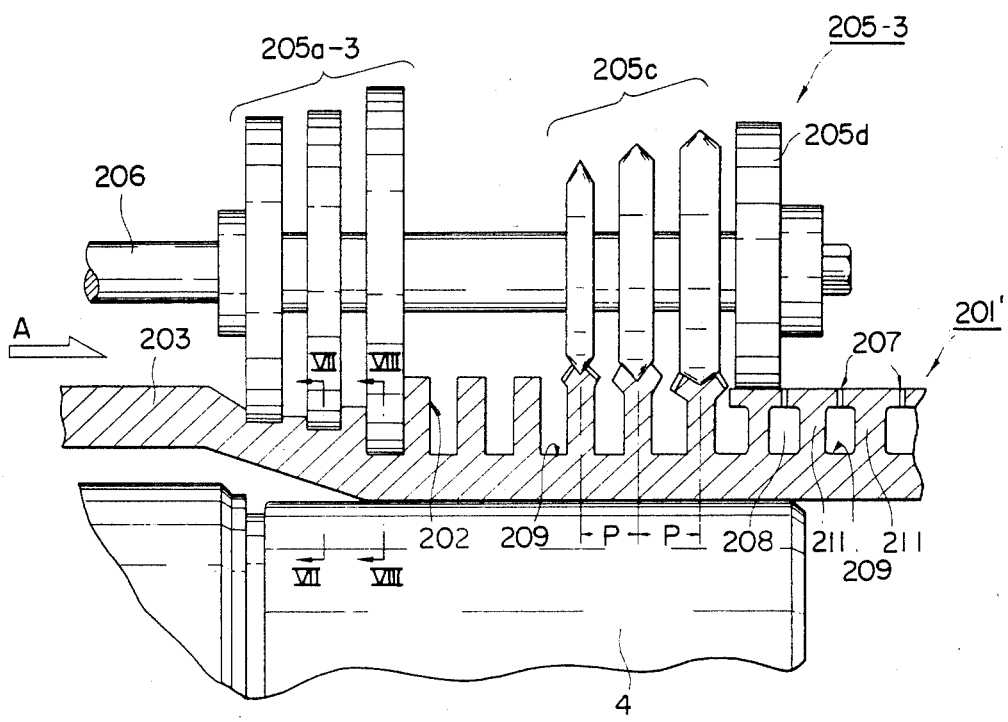
FIG. 19 is a view similar to FIG. 18 but showing another rolling tool employed in combination with the rolling tool of FIG. 18.
Figure 20:
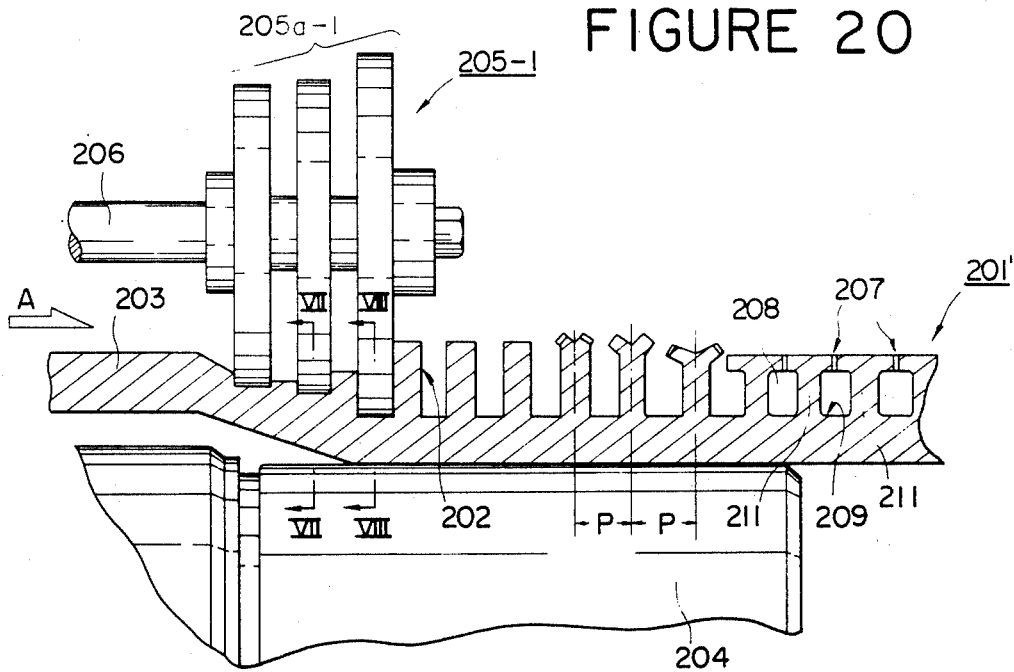
FIG. 20 is a view similar to FIG. 18 but showing still another rolling tool employed in combination with the rolling tool of FIG. 18.

Although three rolling tools of the same construction are adopted in the foregoing embodiments, it is also possible to perform the fin-forming, notching, splitting and flattening operations by three rolling tools of different arrangements shown at 205-1, 205-2 and 205-3 of FIGS. 18 to 20. In this case the rolling tool 205-2 is provided with a set of groove-rolling discs 205a, a notching gear 205b, a set of splitting roller discs 205c and a flattening roller 205d in the same manner as the rolling tool 5 of FIG. 3. On the other hand, as shown in FIGS. 19 and 20, the rolling discs 205-3 consists of a set of grooving roller discs 205a-3, a set of splitting roller discs 205c and a pressing roller 205d, and the rolling tool 205-1 consists of a set of grooving roller discs 205a-1. While advancing a pipe 203 straight in the direction of arrow A in a restricted state on a mandrel 204, the respective rolling tools 205-1 to 205-3 are respectively rotated in the direction of arrow B and at the same time revolved as a whole in the direction of arrow C, thereby simultaneously forming a plurality number of helical fins 202 around the circumference of the pipe, cutting axial notches on half of the notches formed, and splitting and flattening upper fin portions to form a cavity 208 covered under flat side wing portions with a row of openings 207, in the same manner as in the foregoing embodiments.

In this particular embodiment, the rolling tools 205-1 to 205-3 are arranged to simultaneously form a couple of fins, but it is to be understood that a greater number of fins can be formed basically in a similar manner. The operation by the rolling tools 205-1 to 205-3 is as follows.

(1) The first forming stage by the groove-rolling discs 205a-1 to 205a-3: Each set of the groove-rolling discs 205a-1 to 205a-3 consists of a number of grooving discs having outer diameters gradually increased in the rightward direction in FIGS. 19 and 20, and the respective discs are progressively pressed into the outer surface of a blank pipe 203 to form helical grooves 209 thereon in the manner as described hereinabove.

When roll-forming a couple of fins by the use of three sets of roller discs 205a-1 to 205a-3 as in the present embodiment, two rolling tools are located in positions which are shifted by a predetermined distance from a reference rolling tool in the travelling direction of fins (in the direction of arrow A) and which coincide the loci of the two grooves being formed. For example, the following description explains the adjustment in a case where a couple of fins are formed at a rate of 30 fins per inch in total.

Figure 21:
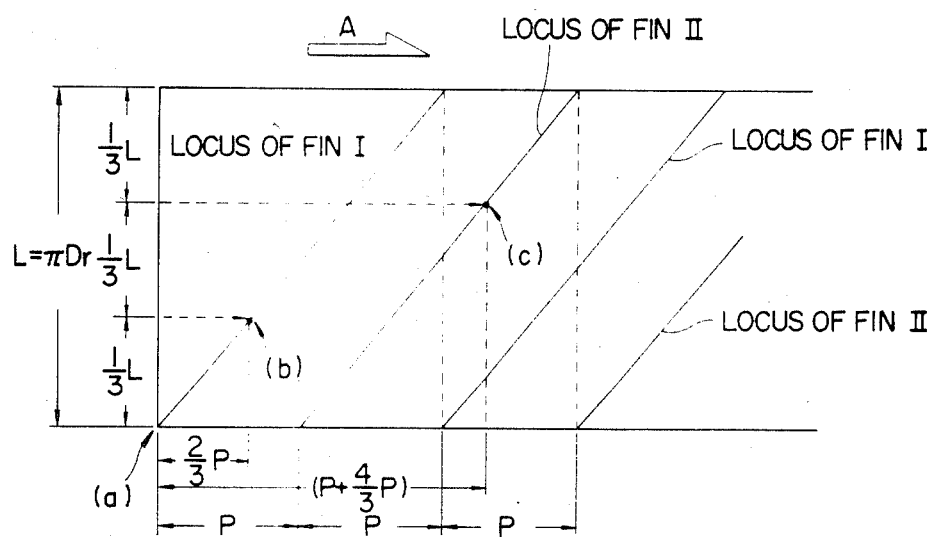
FIG. 21 is a diagrammatic illustration explanatory of a double fin-forming operation.

Referring to FIG. 21, there is diagrammatically shown a pipe which has been formed with fins by the rolling tools at a rate of 30 fins/inch, namely, at a pitch P=2.54 mm/30=0.847 mm. In this case, if the rolling tool 205a-1 is located in the position (a) of FIG. 21, the rolling tool 205a-2 is located in a position (b) which is advanced from the position (a) by ⅔P (=0.564 mm) and the rolling tool 205a-3 is located in a position (c) which is advanced from the position (a) by 7/3P (=1.976 mm). If the respective rolling tools are positioned in this manner, a couple of fins are formed simultaneously, that is to say, a fin I which is formed by the rolling tools 205a-1 and 205a-2 while a fin II which is formed by the rolling tool 205a-3 as is clear from FIG. 21.

Of course, the manner of shifting the positions of the respective rolling tools is not limited to the above-described example. What is essential here is that one fin is rolled by two sets of roller discs and the other fin is rolled by one set of roller discs. A couple of fins which have been formed in this manner are successively subjected to the second forming stage.

(2) The second forming stage by a notching gear 205b: The teeth of a notching gear 205b as shown in FIG. 6 are pressed against the fin 202 to form axial notches 210 at uniform intervals in the circumferential direction. In this stage, the gear member 205b is provided in one of the loci of the two fins to form the notches 210 on one fin alone.

Figure 22:
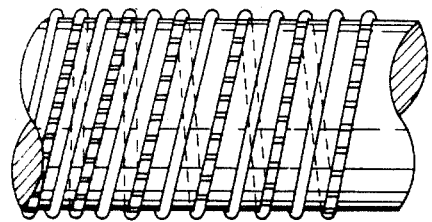
FIG. 22 is a schematic perspective view of a pipe which has undergone a notching operation in a second forming stage.

For this purpose, the gear 205 which serves as a notching tool is mounted, for instance, only on the rolling tool 205-2 and pressed against the fin I alone (or alternatively against the fin II alone). The pipe which has undergone the notching operation by the gear 205b is provided with fins which are alternately notched as illustrated in FIG. 22. In the case of a pipe with four fins I, II, III and IV, for example, the first and third fins I and III alone are notched in that order by means of a couple of notching gears 205b which are located in the loci of the first and third fins, respectively. Consequently, a fin which contains notches and a fin which contains no notches are securely connected with each other in the succeeding third and fourth forming stages. The notches 210 serve to form openings 207 in the final stage in the same manner as in the first embodiment, and the shape of the notches 210 are not limited to a triangular form as mentioned hereinbefore.

(3) The third forming stage by splitting roller discs 205c: The upper portions of the respective fins are split and spread by the splitting roller discs 205c of the rolling tools 205-2 and 205-3. In order to perform the fin splitting operation smoothly, the roller discs 205c of each set are preferred to have outer diameters D', D" and D''', edge angles θ', θ" and θ''', and thicknesses t', t" and t''' as defined hereinbefore in connection with FIG. 3.

Figure 23A:
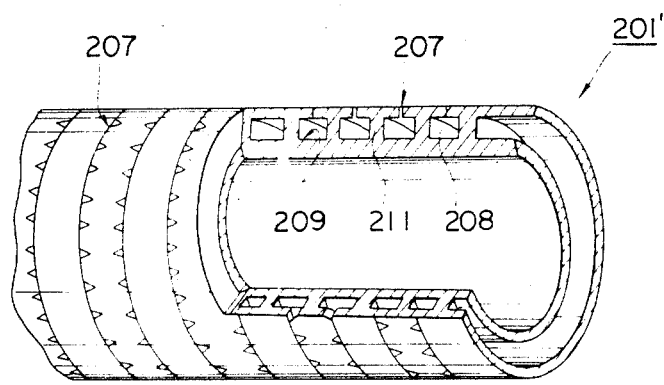
FIGS. 23(a) and 23(b) are partly cutaway and enlarged perspective views of a heat transfer pipe formed by the rolling tools of FIGS. 18 to 20.
Figure 23B:
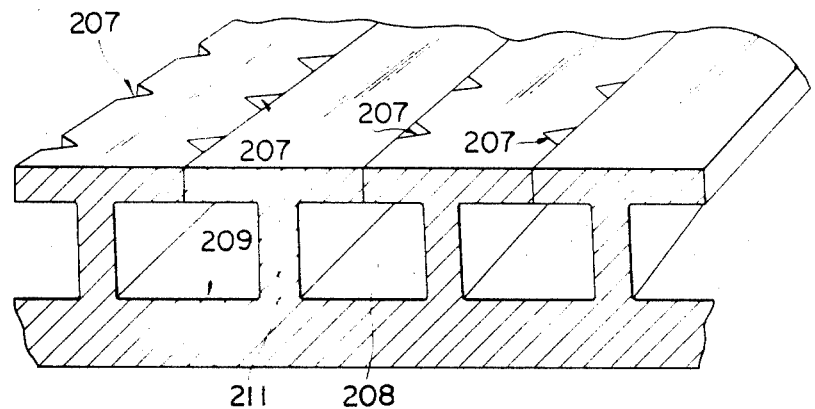

(4) The fourth forming stage by press rollers 205d: This is a finishing stage in which the split upper portions of the fins are rolled into flat side wings by press rollers 205d of rolling tools 205-2 and 205-3, abutting the side wing portions of adjacent fin portions with each other. The resulting heat transfer pipe has a construction as shown in FIGS 23(a) and 23(b), the grooves 209 between the respective fins 202 being covered under a ceiling of side wings with a row of openings 207 at predetermined intervals in the circumferential direction. The upper split portions of a fin with notches 210 are securely abutted against the opposing split portions of a fin without notches, forming openings 207 corresponding to the notches 210 in shape and size.

Also in this case, the rolling tools 205-2 and 205-3 may be provided, instead of a single pressing roller 205d, a set of juxtaposed pressing rollers with outer diameters and thicknesses which are gradually increased in a fashion similar to the splitting rollers, if desired to flatten the side wing portions of the respective fins more smoothly.

The adjacent cave portions can be intercommunicated by forming slits at the bottom of the respective notches by the use of a notching gear with a toothed shape as shown in FIG. 9 in the second forming stage (2).

The embodiment shown in FIGS. 18 to 23 has an advantage in that the openings are 207 can be formed invariably at regular intervals without making a special effort in matching the positions of openings in the abutted side wings of adjacent fins.

Figure 24:
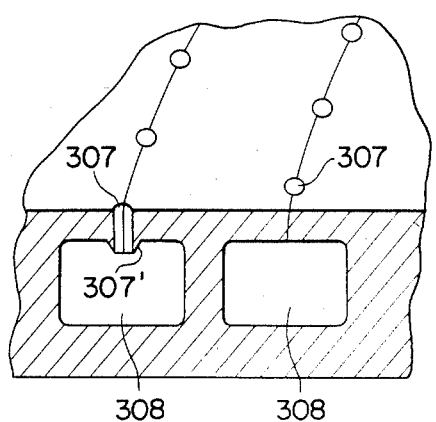
FIG. 24 is an enlarged fragmentary view of a heat transfer pipe having a fringing wall at the inner end of each opening.
Figure 25:
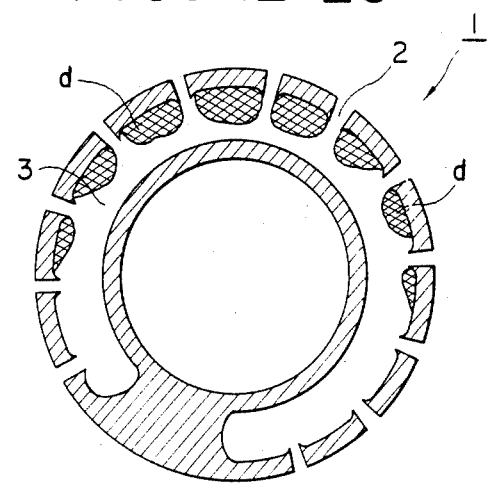
FIG. 25 is a cross-section of the pipe of FIG. 24, showing residual bubbles in an ebullent state.
Figure 26:
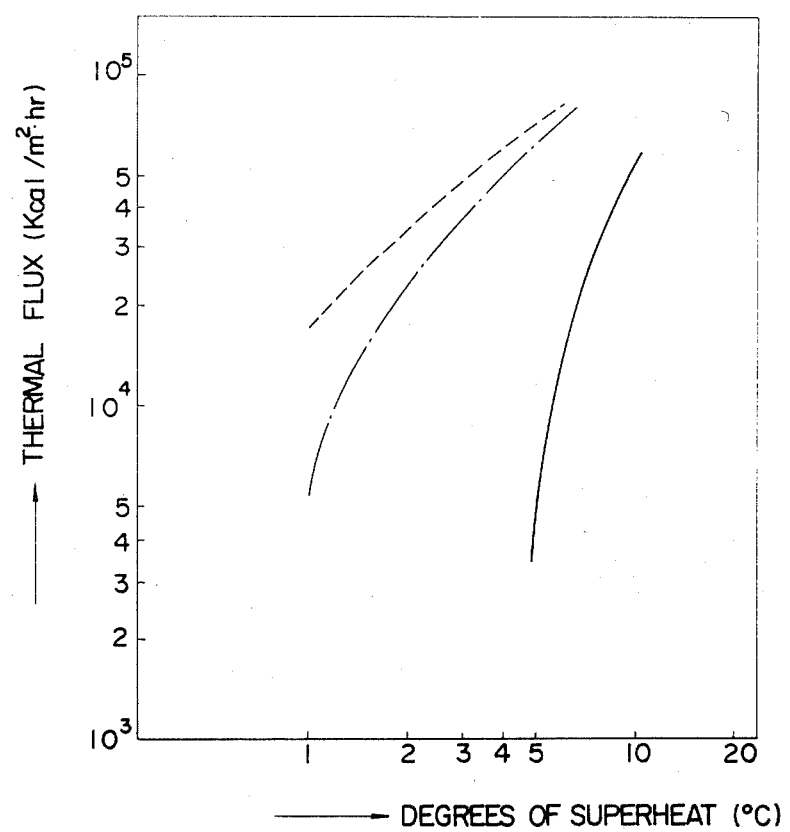
FIG. 26 is a diagram of thermal flux versus the degree of superheating, showing the heat transfer rate of the pipe according to the invention as compared with conventional heat transfer pipes.

Referring now to FIGS. 24 to 26, there is shown a heat transfer pipe 301 which is provided with a fringing wall 307' around the inner end of each opening 307' for the purpose of enhancing the bubble holding and developing function of the pipe. With this heat transfer pipe construction, part of the bubbles which are generated by ebullition remains stably in the upper portions of cavities 308 as indicated by cross-hatched areas d in FIG. 25, serving as nuclei (ebullient nuclei) in a succeeding bubble generating phase, further activating the boiling cycle which consists of generation of bubbles, growth of bubbles, release of bubbles, induction of fresh liquid and generation of bubbles, as mentioned hereinbefore. Consequently, the boiling heat transfer ability of the pipe can be improved to a marked degree, ensuring ebullution to proceeding continuously in a stable state and with an extremely high efficiency even at a low degree of superheating.

In order to form openings 307 with fringing walls 307' across and along the abutted ends of side wings of the respective fins 302 as shown in FIG. 24, it is preferred to bore the openings 307 with the use of a boring tool in a stage subsesquent to the flattening operation rather than using a notching gear member as in the foregoing embodiments.

FIG. 26 shows the results of experiments conducted to test the boiling heat transfer capacity of the heat transfer pipe 301 of the present invention (curve a) in comparison with the conventional boiling heat pipes produced by the methods (2) and (3) referred to at the outset of this specification (curves b and c, respectively). The boiling heat transfer capacity is expressed in terms of the quantity of thermal flux (Kcal/m²hr) at the time of ebullition against the degree of superheating (°C.). As obviously seen in the diagram of FIG. 26, the heat transfer pipe according to the present invention produces greater thermal flux than the conventional heat transfer pipes (curves b and c), and does not show a material drop in thermal flux even at a low degree of superheating as compared with the heat transfer pipe of curve (b). These results of experiments positively confirms the effectiveness of the fringing walls 307' in enhancing the bubble holding and developing function of the heat transfer pipe according to the invention.

It will be understood from the foregoing description that the method of the present invention can produce a boiling heat transfer pipe of extremely high heat transfer capacity by forming helical or annular cavities in the circumferential wall of a blank pipe and a row of openings in the ceiling walls of the cavities spaced regularly at predetermined intervals in the circumferential direction of the pipe, in a simplified and economical manner by the use of a set of rolling tools which are adapted to perform at least fin-forming, splitting and flattening operations successively.

What is claimed is:

1. A method for producing a boiling heat transfer pipe having in the outer circumferential wall thereof a helical cavity the turns of which are separated by a helical fin, said helical cavity having a ceiling through which a plurality of openings lead from said helical cavity to the exterior of said boiling heat transfer pipe and said helical fin having a plurality of holes therethrough leading from one turn of said helical cavity to the next adjacent turn of saids helical cavity, said method comprising the steps of:

(a) pressing a set of rotating groove-rolling discs of gradually increasing diameter against the outer circumferential surface of a blank pipe to form a helical groove separated by a helical fin extending around the outer circumferential surface of said pipe; then (b) pressing a rotating notching gear against the outer surface of said helical fin so as to cut notches in the outer surface of said helical fin which extend from one turn of said helical groove to the next adjacent turn of said helical groove, each of said notches comprising a first, V-shaped portion tapering from a first width at the outer circumferential surface of said pipe to a second, narrower width radially inwardly from the outer circumferential surface of said pipe and a second, slit portion extending radially inwardly from the bottom of the first portion; then (c) pressing a set of rotating splitting roller discs with splitting edges of gradually increasing angle into the outer surface of said helical fin so as to split and spread apart the outer portion of said helical fin, said rotating splitting roller discs extending into said pipe to the level of the top of the second portion of said notches and serving to deform said pipe so as to seal off the tops of the second portions of said notches; and then (d) pressing a rotating press roller against the split outer surface of said helical fin so as to form flat side wings on each side of said helical fin which abut against the flat side wings on the adjacent turns of said helical fin to form a ceiling covering said helical groove and converting said helical groove into a helical cavity, the first, V-shaped portion of said notches cut in said helical fin by said rotating notch gear serving as openings leading from said helical cavity to the exterior of said boiling heat transfer pipe and the second, slit portions of said notches serving as holes leading through said helical fin from one turn of said helical cavity to the next adjacent turn of said helical cavity, whereby migration of the boiling liquid takes place both outwardly through said openings and axially through said holes.

2. A method as recited in claim 1 wherein said set of rotating groove-rolling discs, said rotating notching gear, said set of rotating splitting roller discs, and said rotating press roller are all loosely mounted on the same shaft for independent rotation at different circumferential speeds.

* * * * *